US007085412B2

(12) United States Patent
Platt et al.

(10) Patent No.: US 7,085,412 B2
(45) Date of Patent: Aug. 1, 2006

(54) FILTERING IMAGE DATA TO OBTAIN SAMPLES MAPPED TO PIXEL SUB-COMPONENTS OF A DISPLAY DEVICE

(75) Inventors: John C. Platt, Bellevue, WA (US); Donald P. Mitchell, Bellevue, WA (US); J. Turner Whitted, Pittsboro, NC (US); James F. Blinn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/166,658

(22) Filed: Jun. 24, 2005

(65) Prior Publication Data

US 2005/0238228 A1 Oct. 27, 2005

Related U.S. Application Data

(63) Continuation of application No. 09/481,163, filed on Jan. 12, 2000, now Pat. No. 6,973,210, which is a continuation-in-part of application No. 09/364,365, filed on Jul. 30, 1999, now Pat. No. 6,393,145.

(60) Provisional application No. 60/115,731, filed on Jan. 12, 1999, provisional application No. 60/115,573, filed on Jan. 12, 1999.

(51) Int. Cl.
*G06K 9/00* (2006.01)
*G06K 9/40* (2006.01)
*G06F 17/00* (2006.01)

(52) U.S. Cl. ...................................... 382/162; 382/264

(58) Field of Classification Search ........ 382/162–167, 382/264; 345/418–419, 426, 502, 600, 604, 345/619; 358/515–521
See application file for complete search history.

(56) References Cited

U.S. PATENT DOCUMENTS

| | | | | | |
|---|---|---|---|---|---|
| 4,136,359 | A | * | 1/1979 | Wozniak | 348/510 |
| 4,217,604 | A | * | 8/1980 | Wozniak | 348/701 |
| 4,278,972 | A | * | 7/1981 | Wozniak | 345/600 |
| 4,463,380 | A | * | 7/1984 | Hooks, Jr. | 348/580 |
| 4,513,374 | A | * | 4/1985 | Hooks, Jr. | 365/230.04 |
| 4,663,661 | A | * | 5/1987 | Weldy et al. | 348/242 |
| 5,057,739 | A | * | 10/1991 | Shimada et al. | 313/477 R |
| 5,122,783 | A | * | 6/1992 | Bassetti, Jr. | 345/88 |
| 5,254,982 | A | * | 10/1993 | Feigenblatt et al. | 345/690 |
| 5,298,915 | A | * | 3/1994 | Bassetti, Jr. | 345/696 |

* cited by examiner

*Primary Examiner*—Amir Alavi
(74) *Attorney, Agent, or Firm*—Workman Nydegger

(57) ABSTRACT

Image data processing and image rendering methods and systems whereby images are displayed on display devices having pixels with separately controllable pixel sub-components. Image data, such as data encoded in a three-channel signal, is passed through a low-pass filter to remove frequencies higher than a selected cutoff frequency, which obtain samples from the color components of the signal that map spatially different image regions to individual pixel sub-components. It has been found that color aliasing effects can be significantly reduces at a cutoff frequency somewhat higher than the Nyquist frequency, while enhancing the spatial resolution of the image. The image data is then passed through sampling filters, A generalized set of filters includes nine filters, one for each combination of one color and one pixel sub-component. The filtering coefficients of the filters can be selected to optimize of approximate an optimization of an error metric, which represents the color and luminance errors perceived on the display device. In this manner, a desired balance between color accuracy and luminance accuracy can be obtained. The samples mapped to individual pixel sub-components are used to generate luminous intensity values for the displayed image.

30 Claims, 7 Drawing Sheets

FILTERING IMAGE DATA TO OBTAIN SAMPLES MAPPED TO PIXEL SUB-COMPONENTS OF A DISPLAY DEVICE

BACKGROUND OF THE INVENTION

CROSS REFERENCE TO RELATED APPLICATIONS

This application is a continuation and claims the benefit and priority of U.S. patent application Ser. No. 09/481,163, entitled "Filtering Image Data to Obtain Samples Mapped to Pixel Sub-Components of a Display Device," filed Jan. 12, 2000, now U.S. Pat. No. 6,973,210 which claims the benefit of U.S. Provisional Patent Application Ser. No. 60/115,573, entitled "Resolution and Image Enhancement for Patterned Displays," filed Jan. 12, 1999 and U.S. Provisional Patent Application Ser. No. 60/115,731, entitled "Resolution Enhancement for Patterned Displays," filed Jan. 12, 1999. U.S. patent application Ser. No. 09/481,163 also being a continuation-in-part of U.S. patent application Ser. No. 09/364,365, entitled "Methods, Apparatus and Data Structures for Enhancing the Resolution of Images to be Rendered on Patterned Display Devices," filed Jul. 30, 1999 now U.S. Pat. No. 6,393,145. The pending application incorporates by reference and claims the benefit and priority of all of the foregoing applications.

BACKGROUND OF THE INVENTION

1. The Field of the Invention

The present invention relates to rendering images on display devices having pixels with separately controllable pixel sub-components. More specifically, the present invention relates to filtering and subsequent displaced sampling of image data to obtain a desired degree of luminance accuracy and color accuracy.

3. The Prior State of the Art

As computers become ever more ubiquitous in modern society, computer users spend increasing amount of time viewing images on display devices. Flat panel display devices, such as liquid crystal display (LCD) devices, and cathode ray tube (CRT) display devices are two of the most common types of display devices used to render text and graphics. CRT display devices use a scanning electron beam to activate phosphors arranged on a screen. Each pixel of a CRT display device consists of a triad of phosphors, each of a different color. The phosphors included in a pixel are controlled together to generate what is perceived by the user as a point or region of light having a selected color defined by a particular hue, saturation, and intensity. The phosphors in a pixel of a CRT display device are not separately controllable. CRT display devices have been widely used in combination with desktop personal computers, workstations, and in other computing environments in which portability is not an important consideration.

LCD display devices, in contrast, have pixels consisting of multiple separately controllable pixel sub-components. Typical LCD devices have pixels with three pixel sub-components, which usually have the colors red, green, and blue. LCD devices have become widely used in portable or laptop computers due to their size, weight, and relatively low power requirements. Over the years, however, LCD devices have begun to be more common in other computing environments, and have become more widely used with non-portable personal computers.

Conventional image data and image rendering processes were developed and optimized to display images on CRT display devices. The smallest unit on a CRT display device that is separately controllable is a pixel; the three phosphors included in each pixel are controlled together to generate the desired color. Conventional image processing techniques samples of image data to entire pixels, with the three phosphors together representing a single portion of the image. In other words, each pixel of a CRT display device corresponds to or represents a single region of the image data.

The image data and image rendering processes used with LCD devices are those that have been originally developed in view of the CRT, three-phosphor pixel model. Thus, conventional image rendering processes used with LCD devices do not take advantage of the separately controllable nature of pixel sub-components of LCD pixels, but instead generate together the luminous intensity values to be applied to the three pixel sub-components in order to yield the desired color. Using these conventional processes, each three-part pixel represents a single region of the image data.

It has been observed that the eyestrain and other reading difficulties that have been frequently experienced by computer users diminish as the resolution of display devices and the characters displayed thereon improves. The problem of poor resolution is particularly evident in flat panel display devices, such as LCDs, which may have resolutions 72 or 96 dots (i.e., pixels) per inch (dpi), which is lower than most CRT display devices. Such display resolutions are far lower than the 600 dpi resolution supported by most printers. Even higher resolutions are found in most commercially printed text such as books and magazines. The relatively few pixels in LCD devices are not enough to draw smooth character shapes, especially at common text sizes of 10, 12, and 14 point type. At such common text rendering sizes, portions of the text appear more prominent and coarse on the display device than when displayed on CRT display devices or printed.

In view of the foregoing problems experienced in the art, there is a need for techniques of improving the resolution of images displayed on LCD display devices. While improving resolution, it would also be desirable to accurately render the color of the images to a desired degree so as to generate displayed images that closely reproduce the image encoded in the image data.

SUMMARY OF THE INVENTION

The present invention relates to image data processing and image rendering techniques whereby images are displayed on display devices having pixels with separately controllable pixel sub-components. Spatially different regions of image data are mapped to individual pixel sub-components rather than to full pixels. It has been found that mapping point samples or samples generated from a simple box filter directly to pixel sub-components results in either color errors or lowered resolution. Moreover, it has been found that there is an inherent tradeoff between improving color accuracy and improving luminance accuracy. The methods and systems of the invention use filters that have been selected to optimize or to approximate an optimization of a desired balance between color accuracy and luminance accuracy.

The invention is particularly suited for use with LCD display devices or other display devices having pixels with a plurality of pixel sub-components of different colors. For example, the LCD display device may have pixels with red, green, and blue pixel sub-components arranged on the display device to form either vertical or horizontal stripes of same-colored pixel sub-components.

The image processing methods of the invention can include a scaling operation, whereby the image data is scaled in preparation for subsequent oversampling, and a hinting operation, which can be used to adapt the details of an image to the particular pixel sub-component positions of a display device. The image data signal, which can have three channels, each representing a different color component of the image, is passed through a low-pass filter to eliminate frequencies above a cutoff frequency that has been selected to reduce color aliasing that would otherwise be experienced. Although the pixel Nyquist frequency can be used as the cutoff frequency, it has been found that a higher cutoff frequency can be used. The higher cutoff frequency yields greater sharpness, at some sacrifice of color aliasing.

The low-pass filters are selected to optimize or to approximately optimize the tradeoff between color accuracy and luminance accuracy. The coefficients of the low-pass filters are applied to the image data. In one implementation, the low-pass filters are an optimized set of nine filters that includes one filter for each combination of color channel and pixel sub-component. In other implementations, the low-pass filters can be selected to approximate the filtering functionality of the general set of nine filters.

The filtered data represents samples that are mapped to individual pixel sub-components of the pixels, rather than to the entire pixels. The samples are used to select the luminous intensity values to be applied to the pixel sub-components. In this way, a bitmap representation of the image or a scanline of an image to be displayed on the display device can be assembled. The processing and filtering can be done on the fly during the rasterization and rendering of an image. Alternatively, the processing and filtering can be done for particular images, such as text characters, that are to be repeatedly included in displayed images. In this case, text characters can be prepared for display in an optimized manner and stored in a buffer or cache for later use in a document.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2B, which illustrates in greater detail the upper left hand portion of LCD70, demonstrates the relationship between the pixels and pixel sub-components.

DETAILED DESCRIPTION OF THE INVENTION

Figure 1A:
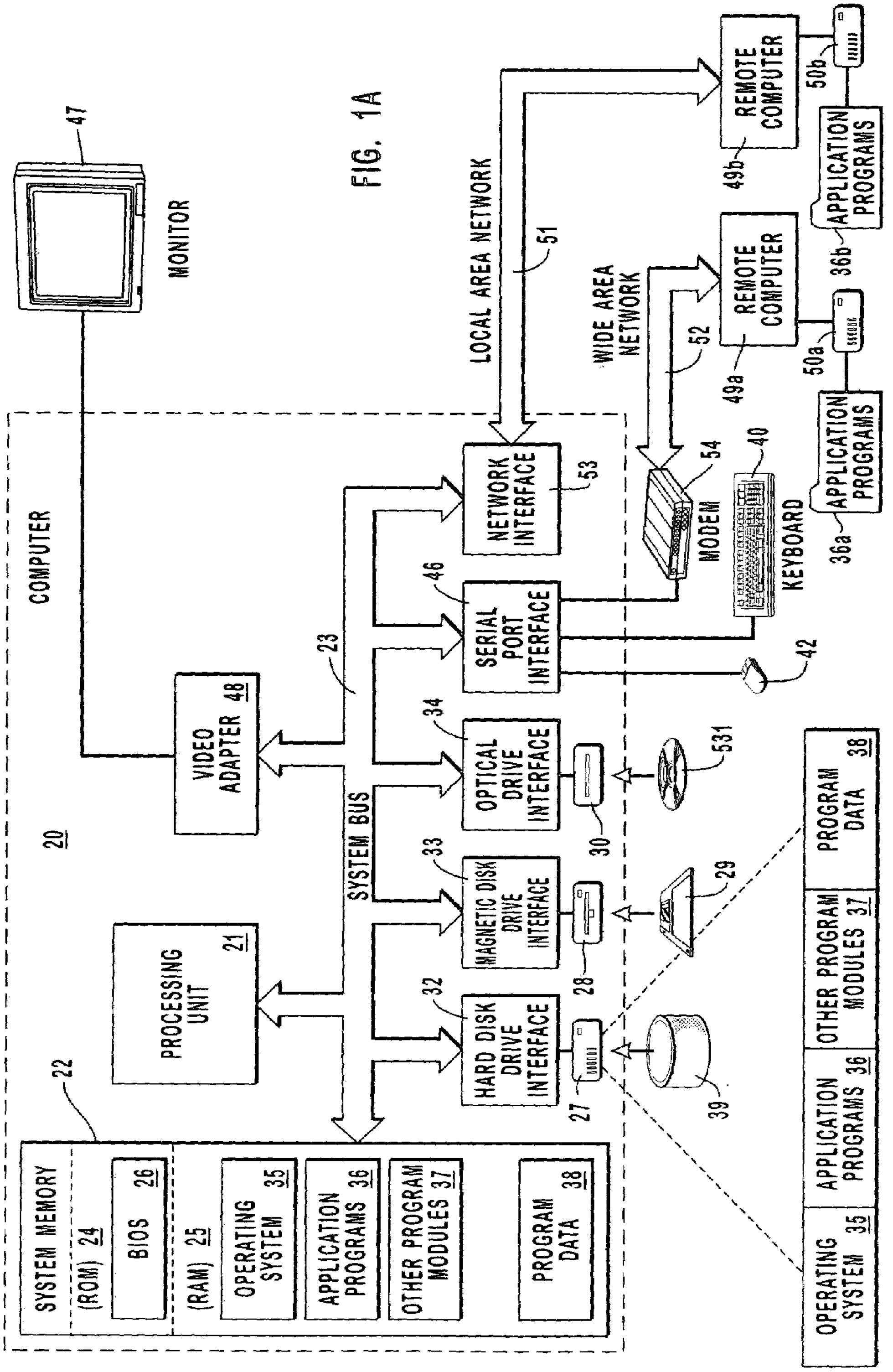
FIG. 1A illustrates an exemplary system that provides a suitable operating environment for the present invention.

The present invention relates to image data processing and image rendering techniques whereby image data is rendered on patterned flat panel display devices that include pixels each having multiple separately controllable pixel sub-components of different colors. When applied to display devices, such as conventional liquid crystal display (LCD) devices, the image data processing operations include filtering a three-channel continuous signal representing the image data through filters that obtain samples that are mapped to the red, green, and blue pixel sub-components. The filters are selected to establish a desired tradeoff between color accuracy and luminance accuracy. Generally, an increase in color accuracy results in a corresponding decrease in luminance accuracy and vice versa. The samples mapped to the pixel sub-components are used to generate luminous intensity values for the pixel sub-components.

The image rendering processes are adapted for use with LCD devices or other display devices that have pixels with multiple separately controllable pixel sub-components. Although the invention is described herein primarily in reference to LCD devices, the invention can also be practiced with other display devices having pixels with multiple separately controllable pixel sub-components.

I. Exemplary Computing Environments

Prior to describing the filtering and sampling operations of the invention in detail, exemplary computing environments in which the invention can be practiced are presented. The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1A and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1A, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used including magnetic cassettes, flash memory cards, digital video disks, Bernoulli cartridges, RAMS, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). An LCD device 47 is also connected to system bus 23 via an interface, such as video adapter 48. In addition to the LCD device, personal computers typically include other peripheral output devices (not shown), such as speakers and printers.

The computer 20 may operate in a networked environment using logical connections to one or more remote computers, such as remote computers 49*a* and 49*b*. Remote computers 49*a* and 49*b* may each be another personal computer, a server, a router, a network PC, a peer device or other common network node, and typically includes many or all of the elements described above relative to the computer 20, although only memory storage devices 50*a* and 50*b* and their associated application programs 36*a* and 36*b* have been illustrated in FIG. 1A. The logical connections depicted in FIG. 1A include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 1B:
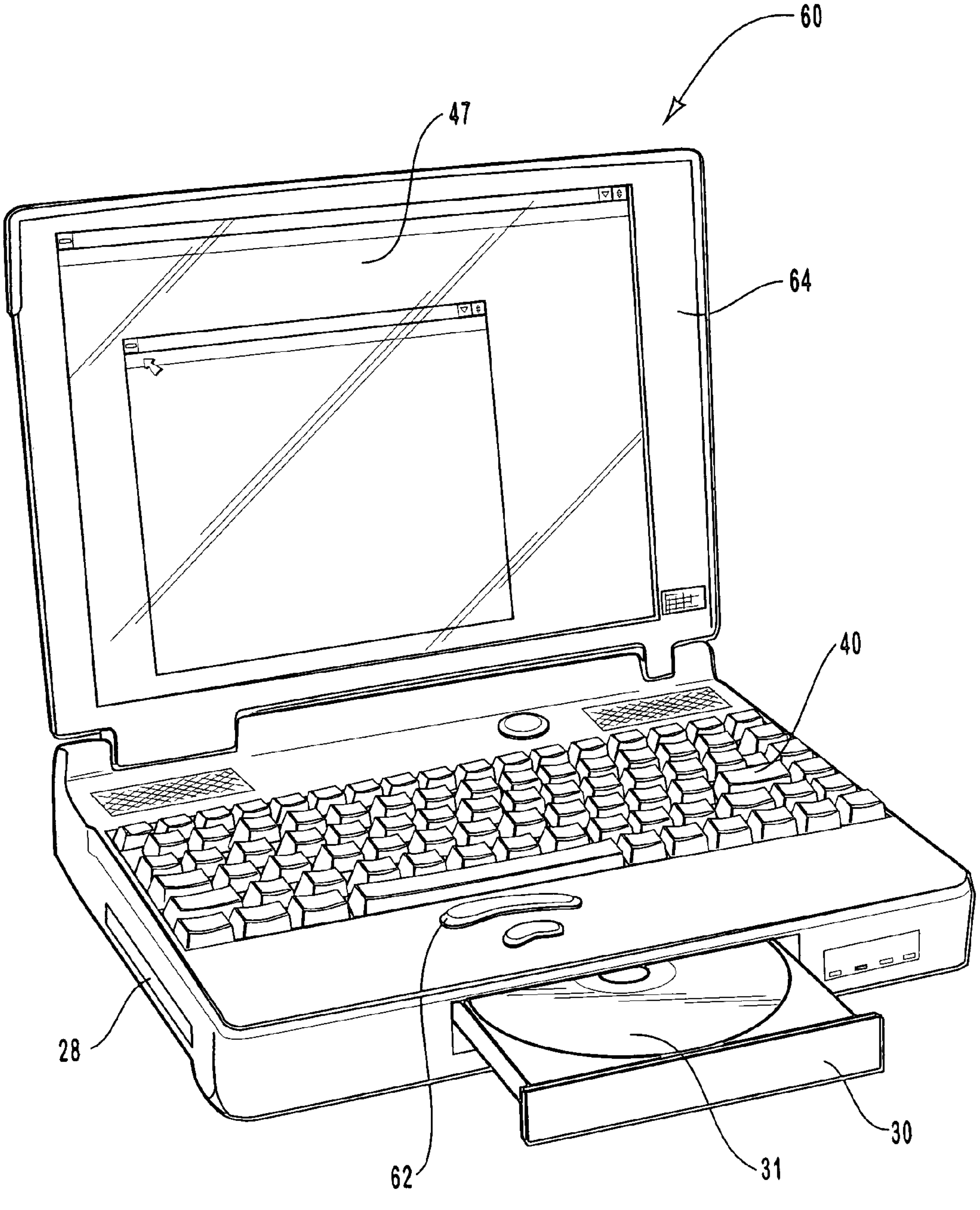
FIG. 1B illustrates a portable computer having an LCD device on which characters can be displayed according to the invention.

As explained above, the present invention may be practiced in computing environments that include many types of computer system configurations, such as personal computers, hand-held devices, multi-processor systems, microprocessor-based or programmable consumer electronics, network PCs, minicomputers, mainframe computers, and the like. One such exemplary computer system configuration is illustrated in FIG. 1B as portable computer 60, which includes magnetic disk drive 28, optical disk drive 30 and corresponding removable optical disk 31, keyboard 40, monitor 47, pointing device 62 and housing 64. Computer 60 may have many of the same components as those depicted in FIG. 1B.

Portable personal computers, such as portable computer 60, tend to use flat panel display devices for displaying image data, as illustrated in FIG. 1B by monitor 47. One example of a flat panel display device is a liquid crystal display (LCD). Flat panel display devices tend to be small and lightweight as compared to other display devices, such as cathode ray tube (CRT) displays. In addition, flat panel display devices tend to consume less power than comparable sized CRT displays making them better suited for battery powered applications. Thus, flat panel display devices are becoming ever more popular. As their quality continues to increase and their cost continues to decrease, flat panel displays are also beginning to replace CRT displays in desktop applications.

Figure 2A:
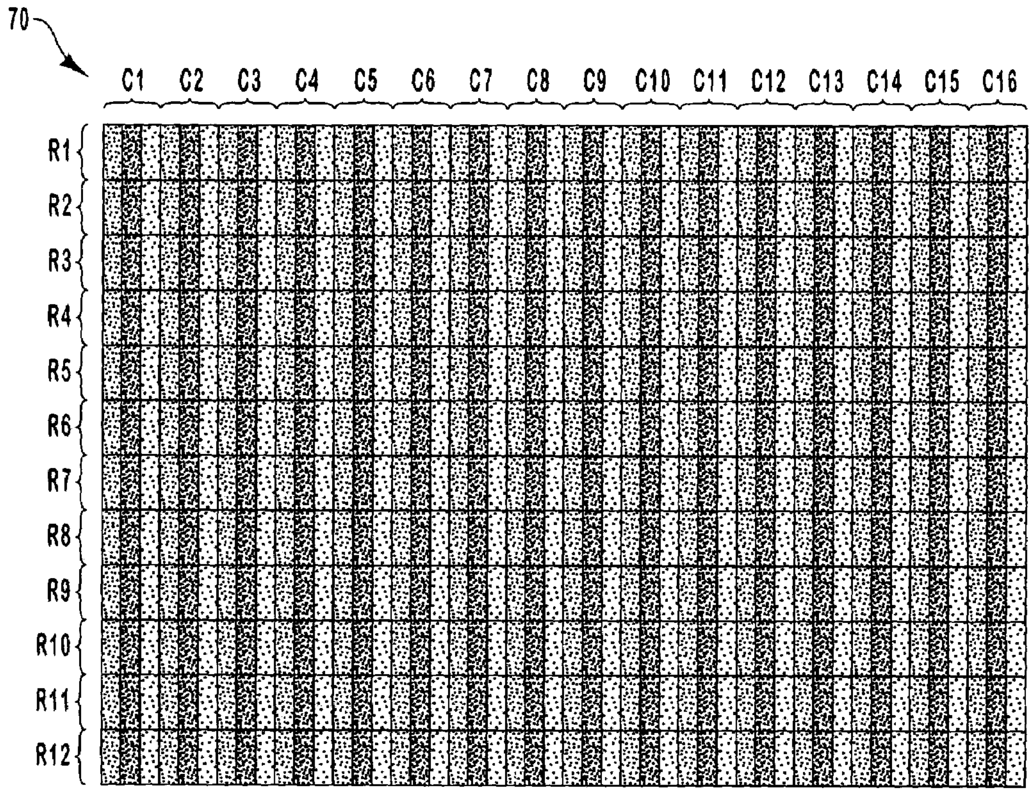
FIGS. 2A and 2B illustrate physical characteristics of an exemplary LCD display device. The portion of LCD 70 depicted in FIG. 2A includes a plurality of rows R1–R12 and a plurality of columns C1–C16. Color LCDs utilize multiple distinctly addressable elements and sub-elements, herein referred to as pixels and pixel sub-components, respectively.
Figure 2B:
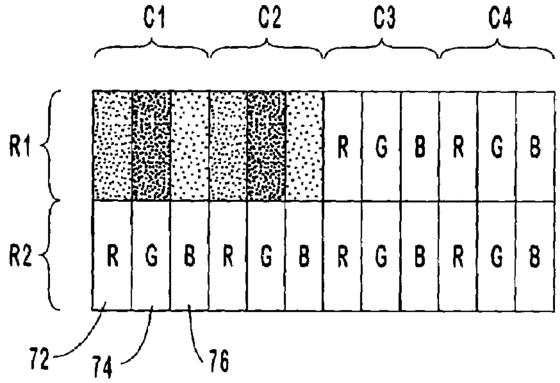

FIGS. 2A and 2B illustrate physical characteristics of an exemplary LCD display device. The portion of LCD 70 depicted in FIG. 2A includes a plurality of rows R1–R16 and a plurality of columns C1–C16. Color LCDs utilize multiple distinctly addressable elements and sub-elements, herein referred to as pixels and pixel sub-components, respectively. FIG. 2B, which illustrates in greater detail the upper left hand portion of LCD 70, demonstrates the relationship between the pixels and pixel sub-components.

Each pixel includes three pixel sub-components, illustrated, respectively, as red (R) sub-component 72, green (G) sub-component 74 and blue (B) sub-component 76. The pixel sub-components are non-square and are arranged on LCD 70 to form vertical stripes of same-colored pixel sub-components. The RGB stripes normally run the entire width or height of the display in one direction. Common LCD display devices currently used with most portable computers are wider than they are tall, and tend to have RGB stripes running in the vertical direction, as illustrated by LCD 70. Examples of such devices that are wider than they are tall have column-to-row ratios such as 640×480, 800×600, or 1024×768. LCD display devices are also manufactured with pixel sub-components arranged in other patterns, including horizontal stripes of same-colored pixel sub-components, zigzag patterns or delta patterns. Moreover, some LCD display devices have pixels with a plurality of pixel sub-components other than three pixel sub-components. The present invention can be used with any such LCD display device or flat panel display device so long as the pixels of the display device have separately controllable pixel sub-components.

A set of RGB pixel sub-components constitutes a pixel. Thus, as used herein, the term "pixel sub-component" refers to one of the plurality of separately controllable elements that are included in a pixel. Referring to FIG. 2B, the set of pixel sub-components 72, 74, and 76 forms a single pixel. In other words, the intersection of a row and column, such as the intersection of row R2 and column C1, represents one pixel, namely (R2, C1). Moreover, each pixel sub-component 72, 74 and 76 is one-third, or approximately one-third, the width of a pixel while being equal, or approximately equal, in height to the height of a pixel. Thus, the three pixel sub-components 72, 74 and 76 combine to form a single substantially square pixel.

II. Filter Selection, Properties, and Use

The image rendering processes of the invention result in spatially different sets of one or more samples of image data being mapped to individual, separately controllable pixel sub-components of pixels included in an LCD display device or another type of display device. At least some of the samples are "displaced" from the center of the full pixel. For example, a typical LCD display device has full pixels centered about the green pixel sub-component. According to the invention, the set of samples mapped to the red pixel sub-component is displaced from the point in the image data that corresponds to the center of the full pixel.

Figure 3:
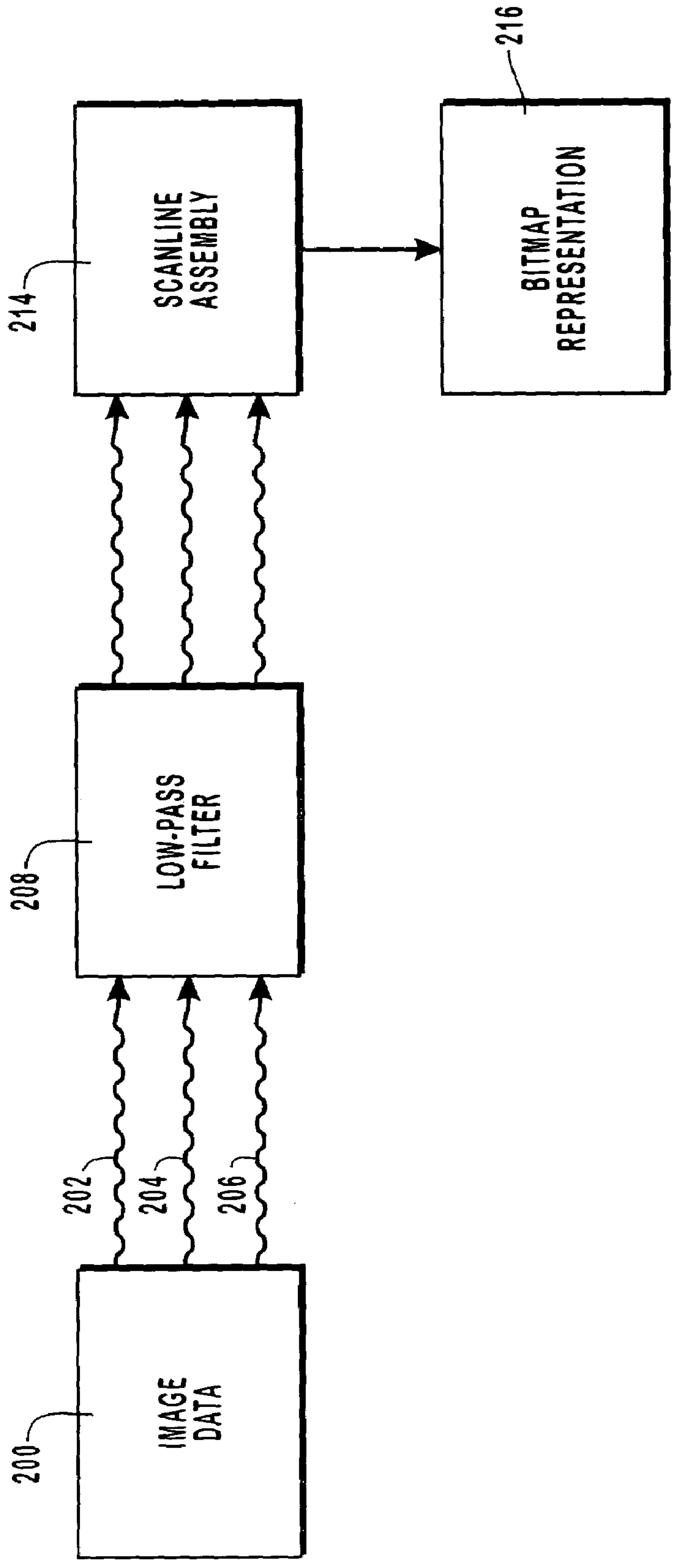
FIG. 3 is a high-level block diagram illustrating selected functional modules of a system that processes and filters image data in preparation for displaying an image on an LCD device.

FIG. 3 is a block diagram illustrating a method in which a continuous, three-channel signal representing image data is processed to generate a displayed image having a desired tradeoff between luminance accuracy and color accuracy. Image data 200 can be a continuous three-channel signal having components 202, 204, and 206 representing red, green, and blue components, respectively, of the image. Alternatively, image data 200 can be sampled image data that is sampled at a rate much higher than the pixel Nyquist rate of the display (e.g., 20 times the pixel Nyquist rate).

The image data processing and image rendering processes in which the filtering techniques of the invention can be used can include scaling and hinting operations. Thus, image data 200 can be data that has been scaled and/or hinted. The scaling operations are useful for preparing the image data to be oversampled in combination with the linear filtering operations of the invention. Further information relating to exemplary scaling operations is found in U.S. patent application Ser. No. 09/168,013, filed Oct. 7, 1998, entitled "Methods and Apparatus for Resolving Edges within a Display Pixel," which is incorporated herein by reference.

The hinting operations can be used to adjust the position and size of images, such as text, in accordance with the particular display characteristics of the display device. Hinting can also be performed to align image boundaries, such as text character stems, with selected boundaries between pixel sub-components of particular colors to optimize contrast and enhance readability. Further information relating to exemplary sampling operations is found in U.S. patent application Ser. No. 09/168,015, entitled "Methods and Apparatus for Performing Grid Fitting and Hinting Operations" filed Oct. 7, 1998, which is incorporated herein by reference.

Image data 200 is passed through low-pass filters 208 as shown in FIG. 3. It is well known that displayed image can represent fine details only up to a certain limit, specifically, sine waves up to a frequency of one-half cycle per pixel width. Thus, in order to eliminate anti-aliasing effects, conventional rendering processes pass the image data signal through low-pass filters that eliminate frequencies higher than the Nyquist frequency. The Nyquist frequency is defined as having a value of one-half cycle per pixel width. According to the invention, as explained in further detailed below, it has been empirically found that the aliasing effects do not become significant until frequencies close to one cycle per pixel are experienced. Thus, low-pass filters 208 can be selected to have a cutoff frequency between a value of one-half cycles per pixel and a value approaching one cycle per pixel. For example, a cutoff frequency in the range of about 0.6 to about 0.9, or more preferably, about 0.67 cycles per pixel can provide suitable anti-aliasing functionality, while improving the spatial resolution that would otherwise be obtained from using a cutoff frequency one-half cycle per pixel.

Low-pass filters 208 operate to obtain samples of the image data that are mapped to individual pixels sub-components in scan conversion module 214 to create a bitmap representation 216 or another data structure that indicates luminous intensity values to be applied to the individual pixel sub-components to generate the displayed image. The operation of the low-pass filters can be expressed mathematically as linear filtering followed by displaced sampling at the locations of the pixel sub-components. As is known in the art, filtering followed by sampling can be combined into one step, where the filters are only applied to regions of the image that result in samples at the desired sampling locations. As used herein, low-pass filters 208 are a combined filtering and displaced sampling operation.

The linear filtering operations disclosed herein relate to the scan conversion of image data that has been scaled and optionally hinted. General principles of scan conversion operations that can be adapted for use with the sampling filters and the linear filtering operations of the invention are disclosed in U.S. patent application Ser. No. 09/168,014, filed Oct. 7, 1998, entitled "Methods and Apparatus for Performing Image Rendering and Rasterization Operations," which is incorporated herein by reference.

Low-pass filters 208 are selected in order to obtain a desired degree of color accuracy while maintaining a desired degree of luminance accuracy, which is perceived as sharpness or spatial resolution. As will be further described hereinafter, there is an inherent tradeoff between enhancing luminance accuracy and enhancing color accuracy on LCD displays, while mapping samples to individual pixel sub-component rather than to full pixels.

Figure 4:
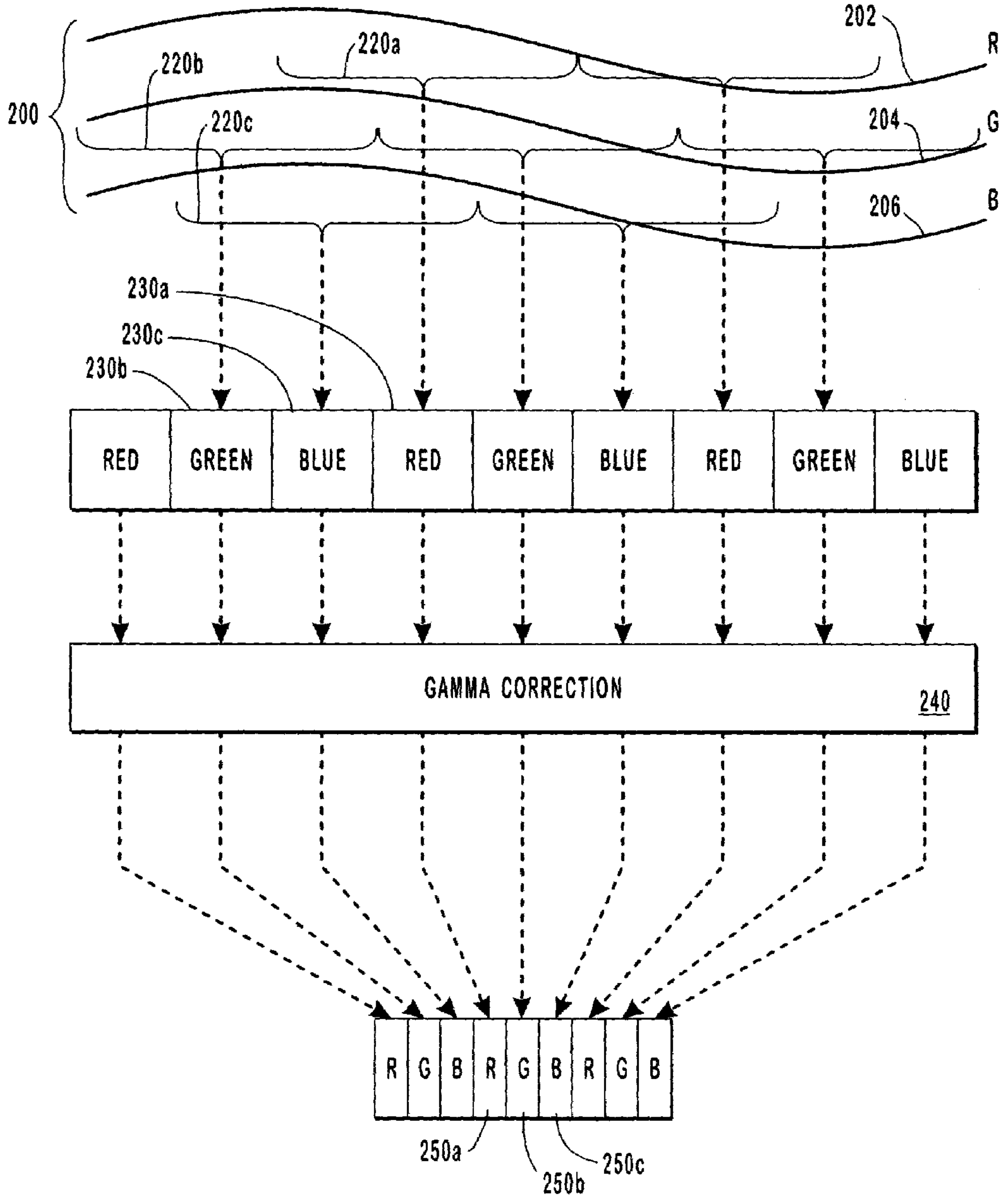
FIG. 4 illustrates one example of filtering followed by displaced sampling of image data. Although the generalized example of filtering the image data according to the invention is described below in referenced FIG. 5, the filtering in FIG. 4 is presented to illustrate the concept of filtering followed by displaced sampling. Image data 200, which is the three-channel, continuous signal having red, green, and blue components 202, 204, and 206, has been passed through a low-pass filter as described above in reference to FIG. 3. Filters 220*a*, having in this example a width corresponding to three pixel sub-components, is applied to channel 202, which represents the red component of the image. Because the sampled data obtained by filter 220*a* is applied to a single pixel sub-component, the sampled data, which is shown at 230*a*, can be referred to as a single sample. Thus, the effective sampling rate according to this embodiment of the invention is one sample per pixel sub-component or three samples per full pixel.

FIG. 4 illustrates one example of filtering followed by displaced sampling of image data. Although the generalized example of filtering the image data according to the invention is described below in referenced FIG. 5, the filtering in FIG. 4 is presented to illustrate the concept of filtering followed by displaced sampling. Image data 200, which is the three-channel, continuous signal having red, green, and blue components 202, 204, and 203, has been passed through a low-pass filter as described above in reference to FIG. 3. Filters 220*a*, having in this example a width corresponding to three pixel sub-components, is applied to channel 202, which represents the red component of the image. Because the sampled data obtained by filter 220*a* is applied to a single pixel sub-component, the sampled data, which is shown at 230*a*, can be referred to as a single sample. Thus, the effective sampling rate according to this embodiment of the invention is one sample per pixel sub-component or three samples per full pixel.

Sample 230*a* is subjected to a gamma correction operation 240, and is mapped to red pixel sub-component 250*a* as shown in FIG. 4. Thus, the sample mapped to red pixel sub-component 250*a* is displaced by ⅓ of a pixel from the center of the full pixel 260, which includes red pixel sub-component 250*a*, green pixel sub-component 250*b*, and blue pixel sub-component 250*c*. Further details relating to gamma correction operations for use with the filtering operations of the invention are found in U.S. patent application Ser. No. 09/364,365, entitled "Methods, Apparatus and Data Structures for Enhancing the Resolution of Images to be Rendered on Patterned Display Devices," which has been incorporated herein by reference.

Similarly, filter 220*b* is applied to channel 204 representing the green component of the image to obtain a sample represented by element 230*b* of FIG. 4. Likewise, filter 220*c* is applied to channel 206 representing the blue component of the image to generate a samples depicted as element 230*c* of FIG. 4. Samples 230*b* and 230*c* are mapped to green pixels of component 250*b* and blue pixels sub-component 250*c*, respectively.

The foregoing sampling and filtering operation described in referenced FIG. 4 yields a displayed image that has minimal color distortions and reasonable spatial resolution. In order to obtain greater spatial resolution, embodiments of the present invention use a set of sampling filters that have been optimized or otherwise selected to establish a desired tradeoff between color accuracy and spatial resolution.

Figure 6:
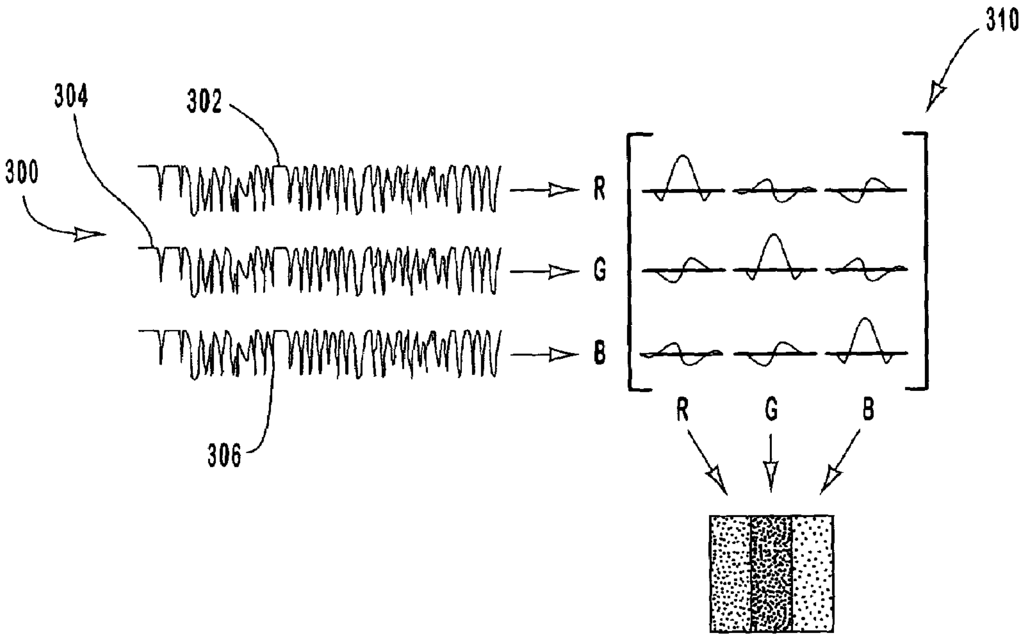
FIG. 6 illustrates a generalized set of nine linear filters that are applied to an image signal to map the image data to red, green, and blue pixel sub-components of pixels on an LCD device.

Prior to discussing the specific details of the generalized set of filters in FIG. 6, a discussion of a mathematical foundation for selecting the filters will be presented. It should be understood that the following discussion of the mathematical foundation for selecting optimized filters represents only one example of the techniques for calculating the values of the filters. Those skilled in the art, upon learning of the disclosure made herein, may recognize other computational techniques and color/luminance models that can be applied to the problem of selecting filters, and the invention extends to processing image data using filters that have been selected according to such techniques.

Exploiting the higher horizontal resolution of a LCD pixel sub-component array can be expressed as an optimization problem. The image data defines a desired array of luminance values having pixel sub-component resolution and color values having full pixel resolution. Based on the image data, the filters can be chosen according to the invention to generate pixel sub-component values that yield an image as close as possible to the desired luminances and colors. To mathematically define the optimization problem, one can mathematically define an error model that measures the error between the perceived output of an LCD pixel sub-component array and the desired output, which as stated above, is defined by the image data. As will be described below, the error model will be used to construct an optimal filter that strikes a desired balance between luminance and color accuracy. One example of a presently preferred approach for defining an error metric and in selecting filters that optimize or approximately optimize the error metric is disclosed in U.S. Provisional Patent Application Ser. No. 60/175,811, which is entitled "Optimal Filtering for Patterned Displays," filed on the same day as the present application, and incorporated herein by reference.

In order to further illustrate how suitable filters can be selected, the following example of defining and solving an optimization problem relating to the perception of luminance and color in a Y,U,V color space is presented. In preparation for identifying the properties of an optimal filter constructed according to the invention, an error metric is defined, which specifies how close an image displayed on a scanline of pixel sub-components appears, to the human eye, to a desired array of luminances and colors. While an LCD device includes pixels with pixel sub-components that are displaced one from another, the foundation for constructing the error metric can be understood by first examining how luminances and colors are defined when the pixels are assumed to be made of three colors [R,G,B] that are co-located.

The luminance, Y, of a co-located pixel is defined as $$Y=0.3R+0.6G+0.1B$$

There are two dimensions of color separate from the brightness. One convenient and conventional way of defining these two color dimensions is $$U=R-Y=0.7R-0.6G-0.1B$$

$$V=B-Y=-0.3R-0.6G+0.9B$$

Figure 5A:
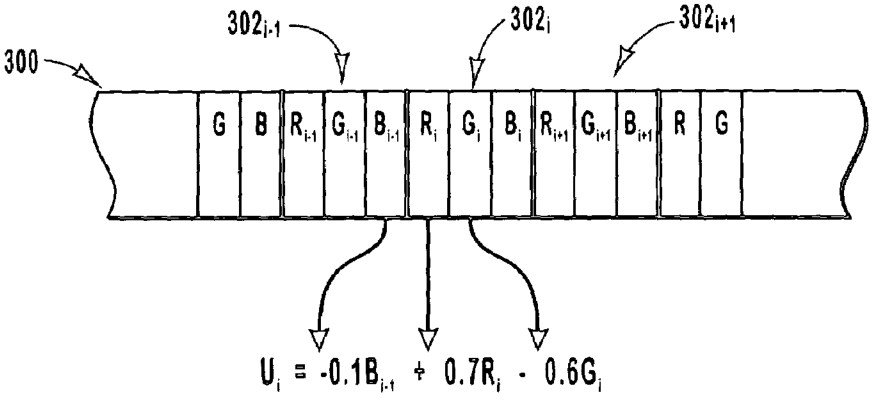
FIGS. 5A–5C depict a portion of a scanline of an LCD device and how Y, U, and V can be modeled for the LCD device according to an embodiment of the invention.

When U=V=0, the pixel is monochromatic (R=G=B). Expanding on the foregoing definition of Y, U, and V, for co-located color sources, one can define a reasonable Y, U, and V for LCD devices, in which the pixel sub-components are displaced one from another. Regarding the definition of color (U, V) for an LCD, it has been observed that an edge of a displayed object appears reddish when the red pixel sub-component is brighter than the green and blue pixel sub-components adjacent to it. Moreover, it is well known that the eye computes a function termed "center/surround", in that it compares a signal at a location to a related signal integrated over the region surrounding the location. Based on these observations, a reasonable model for U with respect to LCDs is to compare a red pixel sub-component to the luminance of the pixel sub-components surrounding it. FIG. 5A graphically represents the technique for computing the value of $U_i$ to be applied to pixels in a scanline of pixel sub-components:

$$U_i=-0.1B_{i-1}+0.7R_i-0.6G_i$$

As shown in FIG. 5A, scanline 300 includes pixels 302$i$-1, 302$i$, and 302$i$+1. The value Ui is calculated, according to this color model, based on the value $R_i$, along with the values of $G_i$ and $B_{i-1}$, with the latter being adjacent to the red pixel sub-component, but in a different pixel. Because the eye perceives color at low resolution, U is considered in this model only for every third pixel sub-component, centered over the red pixel sub-component.

Figure 5B:
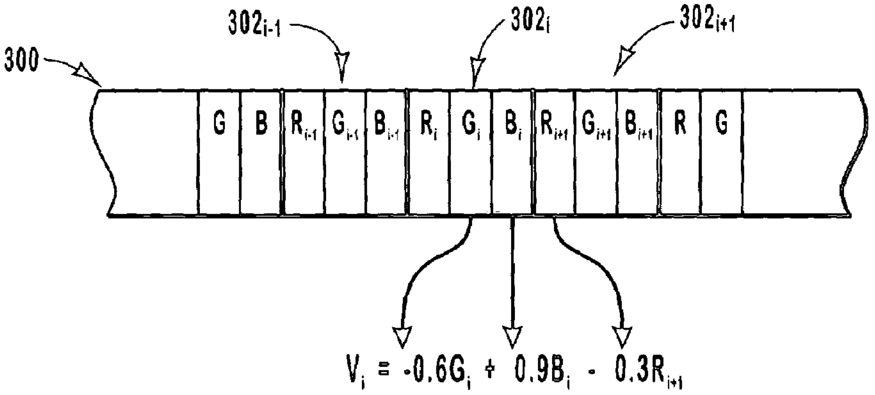
Figure 5C:
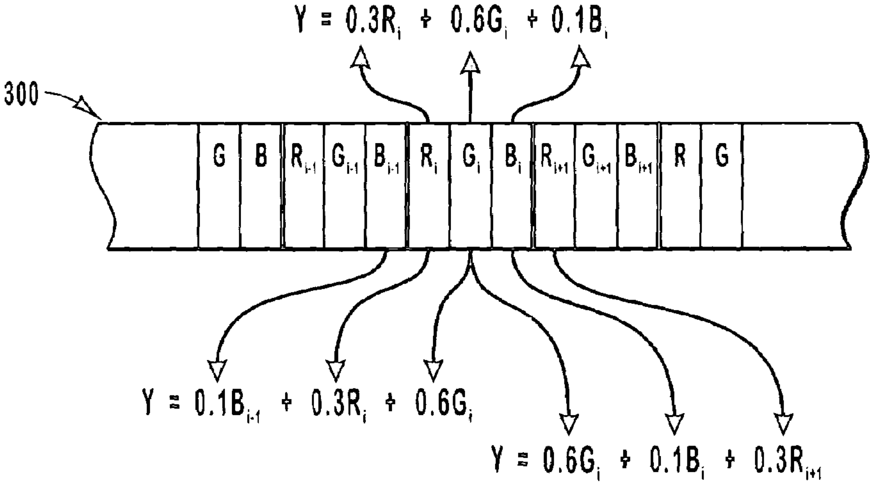

Analogously, an edge of an object displayed on an LCD appears blue when the blue pixel sub-component is brighter than the pixel sub-components adjacent to it. As shown in FIG. 5B, a value of $V_i$ to be applied to pixels in a scanline of pixel sub-components can be calculated:

$$V_i=-0.6G_i+0.9B_i-0.3R_{i+1}$$

Again, due to the relatively low color resolution perceived by the eye, V is computed in this color model only for every third pixel sub-component, centered on the blue pixel sub-component. As shown in FIG. 5B, the value of $V_i$ is calculated in this color model based on the value $B_i$, along with the values of $G_i$ and $R_{i+1}$, with the latter being adjacent to the blue pixel sub-component, but in a different pixel.

Using these definitions of $U_i$ and $V_i$, a color error metric can be defined. The color error metric expresses how much the color of an image displayed on an LCD scanline deviates from an ideal color, which is determined by examining the image data. Given an array of pixel sub-component values designated as $R_i$, $G_i$, and $B_i$, and desired color values of $U_i^*$ and $V_i^*$, the color error metric, which sums the squared errors of the individual color errors, is defined as:

$$E_{color}=\frac{\alpha}{2}\sum_i (U_i-U_i^*)^2+\frac{\beta}{2}\sum_i (V_i-V_i^*)^2$$

where α and β are parameters, the value of which can be selected as desired to indicate the relative importance of U, V, and the color components, in general, as will be farther describe below.

The rest of the error relates to the luminance error. When an LCD displays a constant color (e.g., red), only the red pixel sub-components are turned on, while the green and blue are off. Therefore, at the pixel level, there is an uneven pattern of luminance across the screen. However, the eye does not perceive a uneven pattern of luminance, but instead sees a constant brightness of 0.3 across the screen. Thus, a reasonable luminance model should model this observation, while taking into account the fact that the eye can perceive sub-pixel luminance edges.

One approach for defining the luminance model according to the foregoing constraints is to compute a luminance value at every pixel sub-component by applying the standard luminance formula at every triple of pixel sub-components. $Y_j^*$ is a defined as a desired luminance of the jth pixel sub-component. For the ith pixel, $Y_{3i-2}^*$ is the desired luminance at the red pixel sub-component, $Y_{3i-1}^*$ is the desired luminance at the green pixel sub-component, and $Y_{3i}^*$ is the desired luminance at the blue pixel sub-component. As graphically depicted in FIG. 5C, the values of $Y_{3i-2}$, $Y_{3i-1}$, and $Y_{3i}$, which represent the luminance values as perceived by the eye, can be calculated:

$$Y_{3i-2}=0.1B_{i-1}+0.3R_i+0.6G_i$$

$$Y_{3i-1}=0.3R_i+0.6G_i+0.1B_i$$

$$Y_{3i}=0.6G_i+0.1B_i+0.3R_{i+1}$$

This model for luminance fulfills both constraints. If a constant color is applied to the scanline, then the luminance is constant across a scanline. However, if there is a sharp edge in the pixel sub-component values, there will be a corresponding less sharp perceived edge centered at the same sub-pixel location. Based on the foregoing, the squared error metric for luminance as perceived by the eye for an image displayed on an LCD scanline is $$E_{luminance}=\frac{1}{2}\sum_i (Y_{3i-2}-Y_{3i-2}^*)^2+\frac{1}{2}\sum_i (Y_{3i-1}-Y_{3i-1}^*)^2+\frac{1}{2}\sum_i (Y_{3i}-Y_{3i}^*)^2$$

The total error metric for an LCD scanline is $$E_{total}=E_{luminance}+E_{color}$$

For every three pixel sub-components there are five constraints, namely, three luminances and two colors. Thus, the task of displaying an image on an LCD scanline by inapping samples to individual pixel sub-components is over-constrained. The pixel sub-component array cannot perfectly display the high-frequency luminance with no color error. However, the parameters α and β inside the expression $E_{color}$ control the tradeoff between color accuracy and sharpness. When $\alpha$ and $\beta$ are large, color errors are considered more serious than luminance errors. Conversely, if $\alpha$ and $\beta$ are small, then representing the high-resolution luminance is considered more important than color errors. Thus, $\alpha$ and $\beta$ are parameters that can be adjusted as desired to alter the balance between color accuracy and luminance accuracy. Depending on the implementation of the invention, the values of $\alpha$ and $\beta$ can be set by the manufacturer, or can be selected by a user to adjust the LCD display device to individual tastes.

The total error metric can be used to solve for optimal values of $R_i$, $G_i$, and $B_i$. The values of $Y_j^*$, $U_i^*$, and $V_i^*$ can be computed by, for example, examining image data that has been oversampled by a factor of three to generate point samples corresponding to ($R_j^*$, $G_j^*$, $B_j^*$). The simplest case is when the desired image is black and white, which is often the case for text. For black and white images, $U_i^*=V_i^*=0$ for all pixels, i. The values of $Y_j^*$ can be calculated using the conventional definition of Y, namely, $$Y_j^*=0.3R_j^*+0.6G_j^*+0.1B_j^*.$$

Using no filtering to calculate $Y_j^*$ forces the optimal result with respect to $Y_j$ to have as little luminance error as possible, and consequently, to be as sharp as possible.

For full color images, the values of $U_i^*$ and $V_i^*$ can be calculated by applying a box filter having a width of three samples, or three pixel sub-components, to the image data and using the conventional U and V definitions with respect to the identified ($R_j^*$,$G_j^*$,$B_j^*$) values. While it has been found that a box filter suitably approximates the desired $U_i^*$ and $V_i^*$ values, other filters can be used. The value of $Y_j^*$ is calculated in the same way as described in reference to the black and white case.

The optimal pixel sub-component values ($R_i$,$G_i$,$B_i$) can be calculated by minimizing the total error metric with respect to each of the pixel sub-component variables or, in other words, setting the partial derivative of the error function to zero with respect to $R_i$, $G_i$, and $B_i$:

$$\frac{\partial E}{\partial R_i}=0\quad\frac{\partial E}{\partial G_i}=0\quad\frac{\partial E}{\partial B_i}=0$$

Since the variables $R_i$, $G_i$, and $B_i$ only appear in the error metric quadratically, their derivatives are linear. Accordingly, the equations above can be combined into a linear system:

$$\begin{bmatrix} \bullet\ \bullet\ \bullet \\ \bullet\ \bullet\ \bullet\ \bullet \\ \bullet\ \bullet\ \bullet\ \bullet\ \bullet \\ \bullet\ \bullet\ \bullet\ \bullet\ \bullet \\ \bullet\ \bullet\ \bullet\ \bullet\ \bullet \\ \bullet\ \bullet\ M\ \bullet\ \bullet \\ \bullet\ \bullet\ \bullet\ \bullet\ \bullet \\ \bullet\ \bullet\ \bullet\ \bullet\ \bullet \\ \bullet\ \bullet\ \bullet\ \bullet\ \bullet \\ \bullet\ \bullet\ \bullet\ \bullet \\ \bullet\ \bullet\ \bullet \end{bmatrix} \begin{pmatrix} R_0 \\ G_0 \\ B_0 \\ \vdots \\ R_i \\ G_i \\ B_i \\ \vdots \\ R_{N+1} \\ G_{N+1} \\ B_{N+1} \end{pmatrix} =$$

-continued $$\begin{pmatrix} 0.3Y_1^* \\ 1.2Y_1^*-0.6\beta V_1^* \\ 0.3Y_1^*-0.1\alpha U_1^*+0.9\beta V_1^* \\ \vdots \\ 0.3(Y_{3i-3}^*+Y_{3i-2}^*+Y_{3i-1}^*)+0.7\alpha U_i^*-0.3\beta V_{i-1}^* \\ 0.6(Y_{3i-2}^*+Y_{3i-1}^*+Y_{3i}^*)-0.6\alpha U_i^*-0.6\beta V_i^* \\ 0.1(Y_{3i-1}^*+Y_{3i}^*+Y_{3i+1}^*)-0.1\alpha U_{i+1}^*+0.9\beta V_i^* \\ \vdots \\ 0.9Y_N^*+0.1\alpha U_N^*-0.3\beta V_N^* \\ 1.2Y_N^*+0.6\beta V_N^* \\ 0.3Y_N^* \end{pmatrix}$$

where the matrix M is constant and pentadiagonal—it only has non-zero entries on its main diagonal and the two diagonals immediately next to the main diagonal. The end effects can be handled by adding two extra pixels ($R_0$,$G_0$,$B_0$) and ($R_{N+1}$,$G_{N+1}$,$B_{N+1}$), which are computed along with the rest of the pixels and then discarded.

There are several ways to use the linear system to compute the values of the left-hand vector in the foregoing linear system. First, the right-hand vector can be computed using the desired values of $Y_j^*$, $U_i^*$, and $V_i^*$. The linear system can then be solved for the left-hand vector using any suitable numerical techniques, one example of which is a banded matrix solver.

Another way of solving the linear system for the left-hand vector is to find a direct filter than, when applied to the right-hand-side vector, will approximately solve the system. This technique involves computing the right-hand vector using the desired values of $Y_j^*$, $U_i^*$, and $V_i^*$, then convolving the right-hand vector with the direct filter. This approach for approximating the solution is valid based on the observation that the matrix inverse of M approximately repeats every three rows, except that the three rows are shifted by one pixel. This repeating pattern represents a direct filter that can be used with the invention to approximate the filtering that would strike a precise balance between color accuracy and sharpness.

This approximation would be exact for a scanline having an infinite length. The direct filter can be derived numerically by inverting the matrix M for a large scanline, then taking three rows at or near the center of the inverted matrix. In general, larger values of $\alpha$ and $\beta$ enable the direct filters to be truncated at fewer digits.

A third approach involves combining the computation of the right-hand vector with the direct filtering to create nine filters that map three-times oversampled image data (i.e., $R_j^*$,$G_j^*$,$B_j^*$) directly into pixel sub-component values. The generalized set of nine filters selected according to this third approach is further described in reference to FIGS. 6 and 7.

A more detailed presentation of mathematical techniques for selecting filters for processing image data in accordance to the foregoing example can be found in U.S. Provisional Patent Application Ser. No. 60/115,573 and U.S. Provisional Patent Application Ser. No. 60/115,731, which have been incorporated herein by reference.

Any of the foregoing computational techniques can be used to generate the filters that establish or approximately establish the desired tradeoff between color accuracy and sharpness. It should be understood that the preceding discussion of a mathematical approach for selecting the filters has been presented for purposes of illustration, and not limitation. Indeed, the invention extends to image processing and filtering techniques that utilize filters that conform with the general principles disclosed herein, regardless of the way in which the filters are selected. In addition to encompassing such techniques for processing and filtering image data, the invention also extends to processes of selecting the filters using analytical approaches, such as those disclosed herein.

The invention has been described in reference to an LCD display device having stripes of same-colored pixel sub-components. For LCD devices of this type, the color and luminance analysis presented herein considers only one dimension, namely, the linear direction that coincides with the orientation of the scanlines. In other words, the foregoing model for representing Y, U, and V on the striped LCD display device takes into consideration only the effects generated by the juxtaposition of pixel sub-components in the direction parallel to the orientation of the scanlines. Those skilled in the art, upon learning of the disclosure made herein, will recognize how the model can be defined in two dimensions, which takes into consideration the position and effect of pixel sub-components both above, below, and to the side of other pixel sub-components. While the one-dimensional model suitably describes the color perception of striped LCD devices, other pixel sub-component patterns, such as delta patterns, lend themselves more to a two-dimensional analysis. In any case, the invention extends to filters that have been selected in view of an optimization of an error metric or that conform to or approximate such an optimization, regardless of number of dimensions associated with the color model or other such details of the model.

The foregoing color modeling has been described in reference to R,G,B and Y,U,V measurements of color in the color space. Modeling the perception of color and luminance of the image on a display device having separately controllable pixel sub-components can also be performed with respect to other color dimensions in the color space. Because rotating colors in the color space is simply a linear operation, the "error metric" is accurately and appropriately considered to represent a color error and luminance error, regardless of the color dimensions used in any particular model. Moreover, regardless of the color dimensions used, the optimization problem is appropriately described in terms of striking a balance between color accuracy and luminance accuracy.

A generalized set of optimized filters is illustrated in FIG. 6. The linear filters of FIG. 6 have been generated by, or have properties that conform to, the solution of the linear system described previously. In FIG. 6, signal 300, with channels 302, 304, and 306, are passed through set of filters 310, which includes nine filters, or one filter for each combination of one channel and one pixel sub-component. Specifically, set of filters 310 includes filters that map channels to pixel sub-components in the following combinations: R→R, R→G, R→B, G→R, G→G, G→B, B→R, B→G, and B→B.

Figure 7:
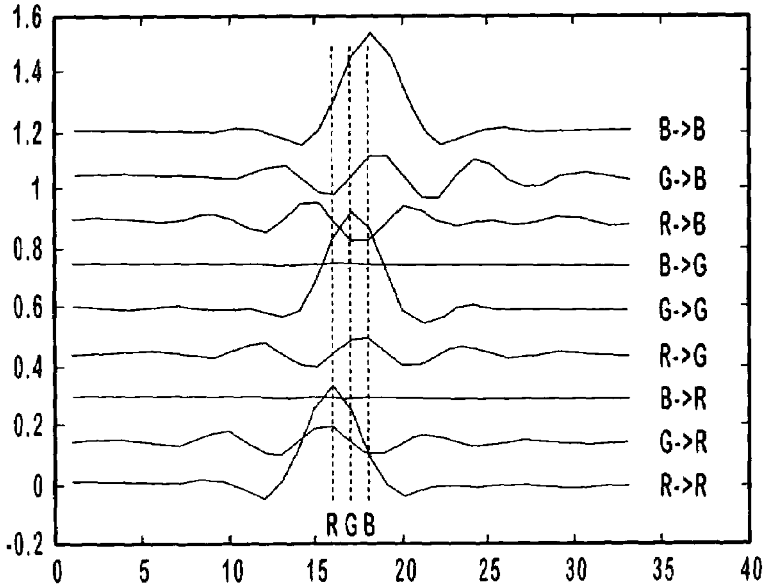
FIG. 7 is a graph showing an example of filter coefficients of the generalized set of nine filters of FIG. 6, which establish a desired balance between color accuracy and luminance accuracy.

One example of the filter coefficients that have been found to generate or approximately generate a desired balance between color accuracy and luminance accuracy is presented in FIG. 7. There are at least two major differences between the optimal filters of FIG. 7 and conventional anti-aliasing filters. First, although the same-color (R→R, G→G, B→B) filters appear in shape much like conventional anti-aliasing filters, each same-color filter is centered generally at the location of the corresponding pixel sub-component, rather than at the center of the full pixel. Conventional anti-aliasing computes the red and blue pixel sub-component values as if they were coincident with the green pixel sub-component, and then displays the red and blue components shifted ⅓ of a pixel to the left or right. If an object in an image contains more than one primary color, the shifting of these primaries using prior techniques can lead to blurring. However, by displacing the anti-aliasing filters according to the invention, the filters eliminate the blurring, at the expense of slight color fringing. The second difference is that all input colors are coupled to all pixel sub-component colors. The coupling is strongest near the pixel Nyquist frequency, which adds luminance sharpness near edges.

As described above, the exemplary optimal filters of FIG. 7 can be completely described as three different linear filters for each of the three pixel sub-components, for a total of nine linear filters. In order to process image data in preparation for displaying the image on the display device, each of the three linear filters is applied to the corresponding color component of the image signal, which has been oversampled by a factor of three or, in other words, which has three samples for each region of the image data that corresponds to a full pixel. The invention can also be practiced by sampling the image data by other factors and by adjusting the filters to correspond to the number of samples. In FIG. 7, the x axis indexes the image data that has been oversampled by a factor of three and the y axis represents the filter coefficients. It is noted that the nine linear filters of FIG. 7 have been vertically displaced one from another on the graph to illustrate the shape of the filters. Thus, the values of the coefficients are measured from a baseline zero for each of the filters, rather than from the zero point on the y axis.

It is also noted that the optimal filters whose input and output are the same color are rounded box filters with slight negative lobes, which gives a more rapid roll-off than a standard box filter. The R→R, G→G, and B→B filters also have a unity gain DC response. However, the filters that connect different colors from input to output are non-zero. Their purpose is to cancel color errors. The different color input/output filters have a zero DC response according to this embodiment of the invention.

While the filters illustrated in FIG. 7 have been found to establish a desired balance between color accuracy and luminance accuracy, the invention also extends to other filters that are suggested from an analysis of the optimized filters or that approximate the solution of the equations that yielded the optimized filters of FIG. 7. For example, the invention can be practiced by using any of a family of filters that include unity DC low-pass filters that connect a color input to the same color pixel sub-component, where the cutoff frequency is between one-half and one cycle per pixel; and zero gain DC response filters connecting color inputs to pixel sub-components having other colors.

As the image data is processed as disclosed herein, including the filtering operations in which the image data is sampled and mapped to obtain a desired balance between color accuracy and luminance accuracy, the image data is prepared for display on the LCD device or any other display device that has separately controllable pixel sub-components of different colors. The filtered data represents samples that are mapped to individual pixel sub-components of the pixels, rather than to the entire pixels. The samples are used to select the luminous intensity values to be applied to the pixel sub-components. In this way, a bitmap representation of the image or a scanline of an image to be displayed on the display device can be assembled.

The processing and filtering can be done on the fly during the rasterization and rendering of an image. Alternatively, the processing and filtering can be done for particular images, such as text characters, that are to be repeatedly included in displayed images. In this case, text characters can be prepared for display in an optimized manner and stored in a font glyph cache for later use in a document.

The image as displayed on the display device has the desired color accuracy and luminance accuracy, and also has improved resolution compared to images displayed using conventional techniques, which map samples to full pixels rather than to individual pixel sub-components.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer program product comprising one or more computer-readable media having computer-executable instructions for implementing, in a processing device associated with a display device that has a plurality of pixels each having a plurality of pixel sub-components, a method of processing image data in preparation for displaying an image on the display device such that the pixel sub-components represent different portions of the image and the image is rendered with a desired degree of luminance accuracy and a corresponding desired degree of color accuracy, wherein the method comprises the steps for:

passing a signal in which the image data is encoded through a low-pass filter, the signal having a plurality of channels each representing a different color component of the image; and based on the filtered signal, generating a data structure in which data representing spatially different regions of the image data are mapped to individual pixel sub-components of a particular pixel rather than being mapped to the entire pixel.

2. A computer program product as recited in claim 1, wherein the effective sampling rate is one sample per pixel sub-component, and wherein the low-pass filter has a cutoff frequency greater than the pixel Nyquist frequency, the Nyquist frequency having a value of one-half cycle per pixel.

3. A computer program product as recited in claim 2, wherein the value of the cutoff frequency of the low-pass filter is greater than the pixel Nyquist frequency and less than one cycle per pixel.

4. A computer program product as recited in claim 3, wherein the value of the cutoff frequency of the low-pass filter is in a range from about 0.6 cycles per pixel to about 0.9 cycles per pixel.

5. A computer program product as recited in claim 1, wherein each of the plurality of pixels has three pixel sub-components, and wherein the low-pass filter comprises nine filters applied to the signal to generate the data representing the spatially different regions of the image data.

6. A computer program product as recited in claim 1, further comprising the step for selecting the filtering coefficients of the low-pass filter to establish a desired tradeoff between color accuracy and luminance accuracy.

7. A computer program product as recited in claim 6, wherein the step for selecting the filtering coefficients is conducted such that the filtering coefficients minimize an error metric constructed for the display device, wherein the error metric represents the color error and luminance error of the display device.

8. A computer program product as recited in claim 7, wherein the error metric is parameterized, such that the error metric can be adjusted for a desired degree of color accuracy and a desired degree of luminance accuracy by selecting the value of the parameters.

9. A computer program product as recited in claim 6, wherein the step for selecting the filtering coefficients is conducted such that the filtering coefficients approximate the filtering coefficients of an optimized filter that minimizes an error metric constructed for the display device, wherein the error metric represents the color error and luminance error of selected portions of the display device.

10. A computer program product as recited in claim 1, wherein the method further comprises the act of rotating the signal in color space, such that the color of the image, which is originally expressed in the signal in terms of R,G, and B, is subsequently expressed in terms of Y, U, and V.

11. A computer program product as recited in claim 1, wherein the method further comprises the step for generating a separate luminous intensity value for each of the pixel sub-components based on the data representing the spatially different region of image data mapped thereto.

12. A computer program product as recited in claim 11, wherein the method further comprises the step for displaying the image on the display device using the separate luminous intensity values, resulting in each of the pixel sub-components of the pixels, rather than the entire pixels, representing different portions of the image.

13. A computer program product as recited in claim 1, wherein the image represents text characters, the step for passing the signal through the low-pass filter and the step for generating the data structure being conducted to generate text character data stored in a font glyph cache, and wherein the method further comprises the step for assembling and displaying a document using the text character data stored in the font glyph cache.

14. A computer program product comprising one or more computer-readable media having computer-executable instructions for implementing, in a processing device associated with a display device that has a plurality of pixels each having a plurality of pixel sub-components, a method of displaying an image on the display device such that the pixel sub-components represent different portions of the image and the image is rendered with a desired degree of luminance accuracy and a corresponding desired degree of color accuracy, wherein the method comprises the acts of:

filtering a signal in which the image data is encoded using a set of filters that includes first through ninth filters, including:

filtering the signal to obtain a first sample to be mapped to a first pixel sub-component of a particular pixel, including passing a first channel of the signal through the first filter, a second channel through the second filter, and a third channel through the third filter;

filtering the signal to obtain a second sample to be mapped to a second pixel sub-component of the particular pixel, including passing the first channel through the fourth filter, the second channel through the fifth filter, and the third channel through the sixth filter; and filtering the signal to obtain a third sample to be mapped to a third pixel sub-component of the particular pixel, including passing the first channel through the seventh filter, the second channel through the eighth filter, and the third channel through the ninth filter; and generating a data structure that includes data representing the luminous intensity values assigned to the pixel sub-components of the pixel based on the first, second, and third samples mapped to the pixel sub-components.

15. A computer program product as recited in claim 14, wherein each of the filters corresponds to one of the plurality of channels and to one of the plurality of pixel sub-components of the particular pixel, and filters the corresponding channel in a region of the image data that is centered generally about the corresponding pixel sub-component.

16. A computer program product as recited in claim 15, wherein at least two of the filters that correspond to one of the plurality of channels overlaps with respect to spatial location.

17. A computer program product as recited in claim 14, further comprising the step for selecting the filtering coefficients of the filters to establish a desired tradeoff between color accuracy and luminance accuracy.

18. A computer program product as recited in claim 17, wherein the step for selecting the filtering coefficients is conducted such that the filtering coefficients minimize an error metric constructed for the display device, wherein the error metric represents the color error and luminance error of a portion of the display device that includes the particular pixel.

19. A computer program product as recited in claim 18, wherein the error metric is parameterized, such that the error metric can be adjusted for a desired degree of color accuracy and a desired degree of luminance accuracy by selecting the value of the parameters.

20. A computer system for displaying an image encoded in a signal with a desired degree of luminance accuracy and a corresponding desired degree of color accuracy, the computer system comprising:

a processing unit;

a display device operably coupled with the processing unit, the display device including a plurality of pixels, each of the plurality of pixels including a plurality of separately controllable pixel sub-components; and a plurality of filters including a low-pass filter, for receiving and processing a signal having encoded image data, the signal also having a plurality of channels each representing a different color component of the image, wherein the filters filter the signal to a data structure in which data representing spatially different regions of the image data are mapped to individual pixel sub-components of a particular pixel rather than being mapped to the entire pixel.

21. A computer system as recited in claim 20, wherein an effective sampling rate is one sample per pixel sub-component, and wherein the low-pass filter has a cutoff frequency greater than a pixel Nyquist frequency, the Nyquist frequency having a value of one-half cycle per pixel.

22. A computer system as recited in claim 21, wherein a value of the cutoff frequency of the low-pass filter is greater than the pixel Nyquist frequency and less than one cycle per pixel.

23. A computer system as recited in claim 22, wherein the value of the cutoff frequency of the low-pass filter is in a range from about 0.6 cycles per pixel to about 0.9 cycles per pixel.

24. A computer system as recited in claim 20, wherein each of the plurality of pixels has three pixel sub-components, and wherein the low-pass filter comprises nine filters applied to the signal to generate the data representing the spatially different regions of the image data.

25. A computer system as recited in claim 20, wherein filtering coefficients of the low-pass filter are selected to establish a desired tradeoff between color accuracy and luminance accuracy.

26. A computer system as recited in claim 25, wherein the filtering coefficients minimize an error metric constructed for the display device, wherein the error metric represents color error and luminance error of the display device.

27. A computer system as recited in claim 26, wherein the error metric is parameterized, such that the error metric can be adjusted for a desired degree of color accuracy and a desired degree of luminance accuracy by selecting the value of corresponding parameters.

28. A computer system as recited in claim 27, wherein the filtering coefficients approximate the filtering coefficients of an optimized filter that minimizes an error metric constructed for the display device, wherein the error metric represents the color error and luminance error of selected portions of the display device.

29. A computer system as recited in claim 20, wherein the computer system rotates the signal in color space, such that the color of the image, which is originally expressed in the signal in terms of R, G, and B, is subsequently expressed in terms of Y, U, and V.

30. A computer system as recited in claim 20, wherein the image represents text characters.

* * * * *

UNITED STATES PATENT AND TRADEMARK OFFICE

CERTIFICATE OF CORRECTION

PATENT NO. : 7,085,412 B2
APPLICATION NO. : 11/166658
DATED : August 1, 2006
INVENTOR(S) : John C. Platt et al.

It is certified that error appears in the above-identified patent and that said Letters Patent is hereby corrected as shown below:

On the Title page, in Item (57), in "Abstract", in column 2, line 13, after "sampling filters" delete "," and insert -- . --, therefor.

In the Specification:

In column 6, line 34, after "used" insert -- , --.

In column 6, line 36, delete "RAMS" and insert -- RAMs --, therefor.

In column 9, line 60, delete "203" and insert -- 206 --, therefor.

In column 10, line 60, delete "in" before "selecting".

In column 11, line 44, delete "Ui" and insert -- $U_i$ --, therefor.

In column 12, line 14, delete "farther" and insert -- further --, therefor.

In column 12, line 64, delete "inapping" and insert -- mapping --, therefor.

In column 14, line 15, delete " $1.2Y_N^* + 0.6\beta V_N^*$ " and insert -- $1.2Y_N^* - 0.6\beta V_N^*$ --, therefor.

Signed and Sealed this

Twenty-seventh Day of July, 2010

David J. Kappos
*Director of the United States Patent and Trademark Office*